United States Patent Office 2,771,353
Patented Nov. 20, 1956

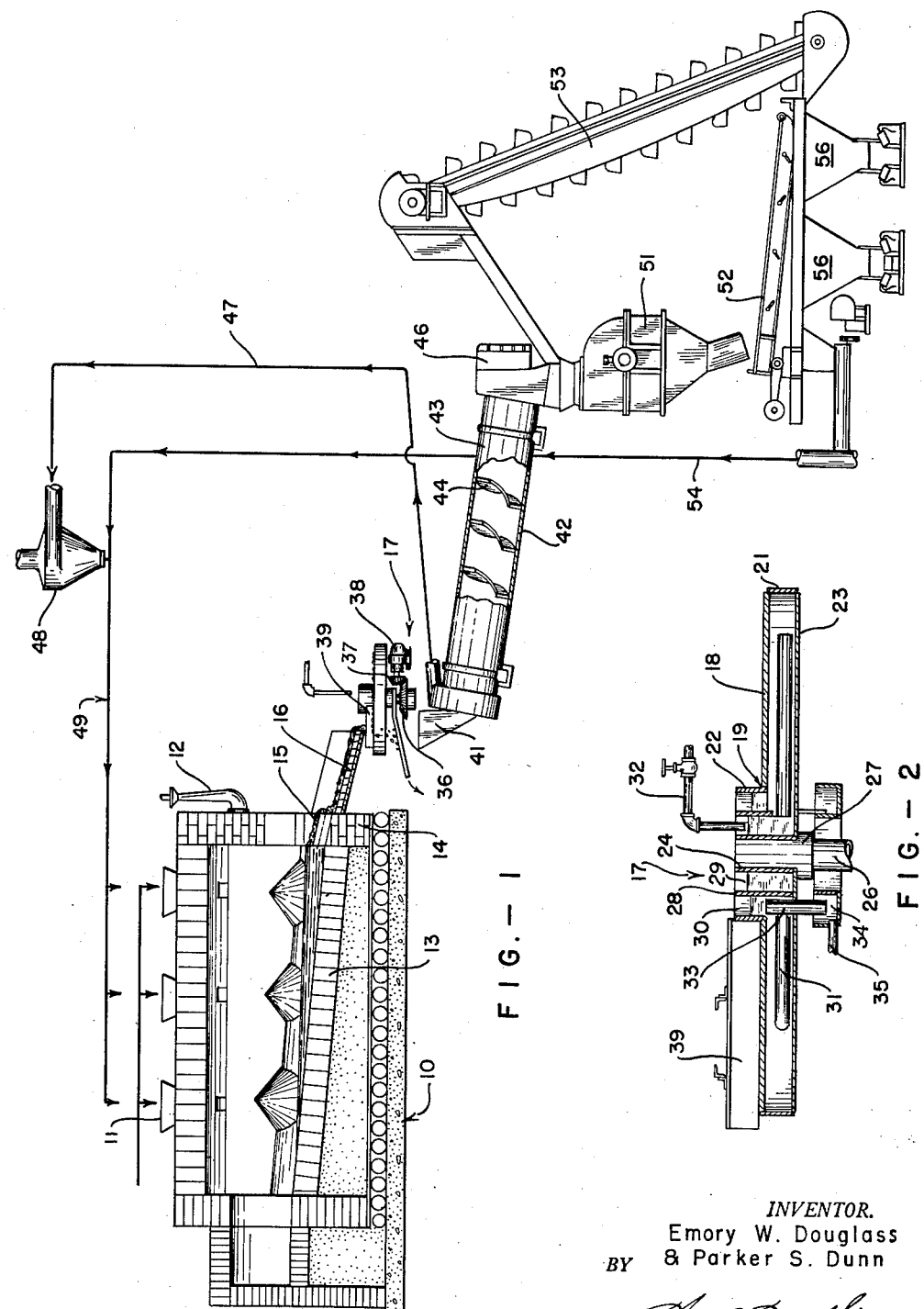
INVENTOR.
Emory W. Douglass
& Parker S. Dunn
ATTORNEY

2,771,353

FUSED POTASH PRODUCT AND METHOD FOR FORMING SAME

Emory W. Douglass and Parker S. Dunn, Carlsbad, N. Mex., assignors to Potash Company of America, a corporation of Colorado Application November 16, 1950, Serial No. 196,074

3 Claims. (Cl. 71—64)

Our invention refers to an improved potash product highly resistant to caking and to a method for producing such a product, and is a continuation-in-part of our applications for Letters Patent, Serial No. 607,172, filed July 26, 1945 and Serial No. 611,929, filed August 21, 1945, both now abandoned.

Various potash salts, particularly salts containing potassium chloride are in widespread commercial use today as basic chemicals, fertilizer, and the like. These products are frequently transported and sold in bulk and are also frequently stored in bulk for considerable periods of time. A great deal of difficulty has been encountered in handling these materials after they have been stored in an atmosphere of relatively high humidity, since the product, by absorbing water from the atmosphere, cakes, forming a hard, rock-like mass, which can be broken into particles small enough for handling only with the greatest of difficulty. In many instances it is necessary to resort to blasting in order to loosen the solidified mass of material. This characteristic has long been recognized and many attempts have been made to reduce the hygroscopicity of the material to a point where it can be safely transported or stored without caking. For example, it has been proposed that the salts be formed in particles which will expose only the minimum surface area to the atmosphere. Others have proposed that the crystals be allowed to grow to the maximum possible size. A third previously proposed treatment has been to coat the particles with some form of water-repellent material. In general, these proposals have failed to win widespread or general acceptance, principally because the degree of improvement obtained by utilization of the proposed method has not been sufficiently great to justify the cost or difficulty of processing.

One of the principal objects of our invention is to provide an improved potash product which can be readily handled, is not friable, and which is highly resistant to caking when exposed to an atmosphere of high humidity.

Another important object of our invention is to provide a process for forming a potash product of low hygroscopicity.

These and other important objects of our invention will be disclosed in the course of the following description and in the appended drawings, in which:

Fig. 1 is a plan view of apparatus suitable for use in the practice of our process, portions of the apparatus being shown in elevation and others in section; and Fig. 2 is a sectional view of a cooling disk forming a part of the apparatus illustrated in Fig. 1.

In brief, we have found that the hygroscopicity of potash materials and particularly potassium chloride of fertilizer grade is largely dependent upon the size of the crystals forming the particles. If, therefore, the potash salt is fused and subsequently cooled very rapidly through a critical range to bring the cake to a temperature considerably below the freezing point, the resulting product will have a crystal structure so fine as to be practically amorphous and will exhibit a markedly reduced hygroscopicity. The critical range referred to is the range in which crystals may form and grow, the upper limit of the range being the temperature at which a crystal may form in the molten salt or a mixture of salts and the lower temperature limit, which is substantially below the eutectic temperature, being a temperature at which crystalline growth and change in character becomes so slow as to be inappreciable. The rate at which the fused salt is cooled through this critical range is of the utmost importance and must not exceed forty (40) seconds, if satisfactory results are to be obtained in using the product. This high rate of cooling can be most effectively accomplished by bringing the fused salt into intimate contact with a cooled metal plate, care being taken to avoid the formation of a thick layer of material on the surface of the plate. Ordinarily, the thickness of the film on the cooling plate should not exceed about one-eighth of an inch. Spraying the fused salt in the form of droplets into the air is not satisfactory, since the rate of cooling through the critical range is not sufficiently rapid to obtain the desired product.

For illustrative purposes, our process will be described as applied to the treatment of a potash salt containing from 95 to 98 percent potassium chloride, the remainder of the material being principally sodium chloride, together in some instances with small quantities of $K_2SO_4$. This material, which is a refined potash product such as that obtained by processing potash ores from deposits in the neighborhood of Carlsbad, New Mexico, may be melted in a suitable furnace 10, preferably of the reverberatory type, having charging openings 11 formed in its roof and a suitable source of heat such as a burner 12. The furnace 10 is preferably provided with a forwardly sloping floor 13 joined to an end wall 14, the latter being provided with a discharge opening 15, located above the bottom 13 near the deepest portion of the pool formed in the furnace by melting or fusing of the salt. The material described will melt at about 755° C. and is discharged at about that temperature from the opening 15 into a trough 16, which in turn discharges the molten salt on to the upper surface of a cooling disk 17.

The cooling disk 17 is illustrated in detail in Fig. 2 and includes a flat upper circular plate 18, having an axial opening 19 and a depending peripheral flange 21. A cylindrical flange 22 is secured near one end to the disk 18 and projects upwardly from the opening 19. A lower circular plate 23 is secured at its periphery to the depending flange 21 and includes an axial opening in which is secured an upwardly extending cylindrical flange 24 concentric with the flange 22. A shaft 26 is fitted into the flange 24 and is provided with a collar 27 upon which the disk 23 rests. An intermediate cylindrical flange 28 is secured at its lower extremity to the plate 23 and projects upwardly between the flanges 24 and 22 defining an inlet chamber 29 and an outlet chamber 30.

Radially disposed pipes 31, extending outwardly from the flange 28, receive cooling water introduced into the inlet chamber 29 from a suitable conduit 32 and discharge the water near the depending peripheral flange 21. The cooling water is discharged from within the disk 17 through an outlet pipe 33, which extends upwardly through the plate 23 into the outlet chamber 30. Preferably the mouth of the outlet pipe 33 is elevated a predetermined distance above the inner surface of the plate 23 in order to establishing a minimum cooling water level within the disk. If desired, the discharge pipe 33 may discharge into a suitable trough 34 having an outlet 35.

The shaft 26 is driven at a predetermined speed by a suitable bevel gear 36 secured to the shaft 26 and meshing with a bevel pinion 37, which is in turn connected with the shaft of a suitable motor 38. A suitable scraper 39 is mounted for engagement with the surface of the disk and serves to remove the solidified salts therefrom. The solidified salts form a film preferably about one-eighth of an inch thick on the surface of the cooling disk 17, and are fractured by the scraper into a number of relatively small flakes, which fall from the disk into a suitable hopper 41 communicating with a cooling conveyer 42. The conveyer 42 may suitably be in the form of a rotatable cylinder 43 having internally disposed spiral flights 44 and provided near its outlet with means such as a fan 46 for passing cool air through the conveyer 42. Since the air in passing through the conveyer 42 will entrain fine particles or dust, conduit means 47 are provided for passing this material to a suitable cyclone separator 48, the discharge of which communicates with the furnace through a conduit 49.

Material from the cooling conveyer 42 discharges into a grinder 51, which in turn discharges onto a screen 52, or the like. Oversize material from the screen 52 may be recirculated to the grinder 51 by a conveyer 53, while undersize material from the screen may be conveyed to the furnace 10 for remelting through a conduit 54 communicating with conduit 49. Properly sized material may be discharged from the screen 52 into hoppers 56 for storage.

The actual temperature at which the molten material is delivered to the cooling disk 17 is not of particular importance, but for purposes of economy should closely approximate the melting point of the mixture plus 5° C., which constitutes the upper temperature limit of the critical range. In the instance of substantially pure KCl, this temperature will be 780° C. and for KCl containing 20% NaCl this temperature will be 705° C., and for a 50-50% mixture of KCl and NaCl this temperature will be 665° C. The speed of rotation of the cooling disk 17 and the temperature, volume, and velocity of the cooling water within the disk 17 must be such as to reduce the temperature of the thin layer of molten salt on the surface of the disk to a temperature of 500 degrees C. within forty seconds, since otherwise crystals of appreciable size will form in the mass and the desired reduction in hygroscopicity will not be obtained. Since the rate of heat transfer through the fused salt on the suprface of the disk is limited, it is obvious that the formation of a thick layer of salt must be avoided, for otherwise it will be impossible to cool the entire mass of material with sufficient rapidity.

On the other hand, if the thickness of the salt layer on the cooling disk is too thin, an excessive number of fines will be formed by the grinder 51, which is also undesirable. Preferably, therefore, the thickness of the salt layer on the disk 17 should be not less than one-sixteenth of an inch and not more than about an eighth of an inch, although thicker layers of material may be utilized if the cooling capacity of the apparatus is adequate.

The temperature of the material removed by the scraper 39 must not exceed 500° C., which constitutes the lower limit of the critical range, which as previously noted is the range of temperature within which the growth and change in character of crystals may occur at an appreciable rate. Below 500° C., the growth of crystals is theoretically possible, but actually proceeds at such an extremely slow rate as to be non-existent for practical purposes.

The product resulting from our process is a flake material having a glassy sheen and no apparent crystalline structure. Even when examined under the most powerful optical microscopes available the crystalline structure can not be detected. The refractive index of the material is such as would be attributable to a solid solution of the two major components, namely, potassium chloride and sodium chloride. However, X-ray diffraction measurements indicate that the product apparently contains sub-microscopic crystals having a maximum diameter on the order of one micron, the average diameter being between 0.01 and 0.10 micron. Since the structure thus obtained is not truly crystalline and yet not amorphous, it is herein referred to as crystallite.

To illustrate the reduced hygroscopicity of our improved product, a series of tests were carried out directly comparing the conventional potash product with the improved product herein disclosed and referred to as the fused product. Analysis of the crystalline or conventional product indicated a potassium chloride content of about 95.8 percent, while the fused crystallite product contained about 96.1 percent potassium chloride content, the balance in each instance consisting principally of sodium chloride. The crystalline product contained on the order of one-tenth of on percent miscellaneous impurities, such as silicon dioxide, acid-insoluble, organic matter, and the like. Each of the materials were crushed and screened to pass entirely through an eight mesh screen and to be retained upon a twenty mesh screen. This material was subjected to an atmosphere having a relative humidity of 80% at normal temperatures and pressures with the following results:

| Time, hours | Water absorption | |
|---|---|---|
| | Crystal, percent | Fused, percent |
| 24 | 1.98 | 0.83 |
| 48 | 3.19 | 1.41 |
| 72 | 4.45 | 2.11 |
| 120 | 7.80 | 3.37 |
| 168 | 9.52 | 4.16 |

Another series of tests, conducted under identical conditions with the identical material, but using material ground to pass a 48 mesh screen, yielded the following results:

| Time, hours | Water absorption | |
|---|---|---|
| | Crystal, percent | Fused, percent |
| 24 | 1.56 | 1.07 |
| 48 | 2.38 | 1.63 |
| 72 | 3.55 | 2.52 |
| 120 | 5.55 | 4.00 |
| 168 | 5.95 | 4.57 |

These tests, conducted at Carlsbad, New Mexico, conclusively demonstrate the reduced hygroscopicity of our product, which differs markedly from the crystalline product heretofore accepted as standard. By virtue of its reduced hygroscopicity it may be stored for extended periods of time in atmospheres of relatively high humidity without excessive caking and even after caking forms a friable mass which disintegrates with relative ease upon the application of moderate pressure.

The presence of slightly increased quantities of impurities of the type naturally occurring in potash ores does not appreciably alter the times or temperatures herein specified as critical, although in certain instances minor variations will be found necessary or desirable.

We claim:

1. The process of decreasing the hygroscopicity of potash material comprising at least about 95% potassium chloride mixed with lesser quantities of impurities including sodium chloride or sulfates of potassium, which comprises the steps of fusing such a material and then cooling it to form a solidified material, said cooling including contacting a thin film of the molten material with a cool horizontal metal surface to lower the temperature throughout the material from about its melting point to about 500° C. in not more than about forty seconds and scraping the solidified material from the surface to form a flaked material characterized by the absence of observable crystal structure, low hygroscopicity and reduced caking tendency.

2. The process of decreasing the hygroscopicity of potash material comprising at least about 95% potassium chloride mixed with lesser quantities of impurities including sodium chloride or sulfates of potassium, which includes the steps of fusing such a material and then cooling it to form a solidified material, said cooling including contacting a thin film of about one-eighth inch thick of the molten material with a cool horizontal metal surface to lower the temperature from about 5° above its melting point to about 500° C. in not more than about forty seconds, and scraping the solidified material to form a flaked material characterized by the absence of observable crystal structure, low hygroscopicity and reduced caking tendencies.

3. An improved potash material containing about 95% potassium chloride mixed with lesser amounts of impurities including sodium chloride or potassium sulfate resulting from a quickly cooled mass of the material from the temperature of at least about 5° above its melting point and to a temperature of about 500° C. in not more than forty seconds, so that a material is formed being characterized by being thin flakes, the absence of observable crystals, a refractive index attributable to a solid solution of said components, and being substantially non-hygroscopic and of lowered cake-forming tendencies.

References Cited in the file of this patent

UNITED STATES PATENTS

| 321,636 | Penniman | July 7, 1885 |
| 1,312,430 | Benjamin | Aug. 5, 1919 |
| 2,041,448 | Zinn | May 19, 1936 |

FOREIGN PATENTS

| 386,466 | Great Britain | Jan. 19, 1933 |